(12) United States Patent
Frank et al.

(10) Patent No.: US 7,596,671 B2
(45) Date of Patent: Sep. 29, 2009

(54) PRE-PAID COMPUTER MONITORING HARDWARE

(75) Inventors: Alexander Frank, Bellvue, WA (US); Jack Creasey, Redmond, WA (US); Nicholas Temple, Renton, WA (US); Thomas C. Phillips, Bellevue, WA (US); William J. Westerinen, Sammamish, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 11/370,411

(22) Filed: Mar. 8, 2006

(65) Prior Publication Data

US 2007/0150681 A1      Jun. 28, 2007

Related U.S. Application Data

(63) Continuation of application No. 60/734,808, filed on Nov. 9, 2005.

(51) Int. Cl.
G06F 12/14      (2006.01)
(52) U.S. Cl. .................................................. 711/163
(58) Field of Classification Search .................. 711/163
See application file for complete search history.

(56) References Cited

U.S. PATENT DOCUMENTS

| 5,541,368 A * | 7/1996 | Swamy ....................... 174/266 |
| 5,613,089 A | 3/1997 | Hornbuckle | |
| 5,883,432 A * | 3/1999 | Higashiguchi ............... 257/727 |
| 6,556,894 B1 | 4/2003 | Nguyen | |
| 6,738,810 B1 * | 5/2004 | Kramer et al. ............... 709/224 |
| 6,785,658 B1 | 8/2004 | Merker et al. | |
| 6,868,388 B1 | 3/2005 | Millsap et al. | |
| 7,299,328 B2 * | 11/2007 | Noble ......................... 711/163 |
| 7,305,561 B2 * | 12/2007 | Hunt et al. ................... 713/182 |
| 2002/0147601 A1 | 10/2002 | Fagan | |
| 2002/0165819 A1 | 11/2002 | McKnight et al. | |
| 2003/0004875 A1 * | 1/2003 | Kramer et al. ................. 705/40 |
| 2003/0140057 A1 | 7/2003 | Thomas et al. | |
| 2004/0186620 A1 | 9/2004 | Monroe Chirnomas | |
| 2005/0108381 A1 | 5/2005 | Hunt et al. | |
| 2006/0117156 A1 * | 6/2006 | Chai et al. ................... 711/163 |

FOREIGN PATENT DOCUMENTS

GB      2325319      11/1998
WO      WO-0043937      7/2000

OTHER PUBLICATIONS

England et al., "A Resource Leasing Policy for On-demand Computing," http://www-users.cs.umn.edu/~jon/papers/ijhpca.pdf.
"Desktop Computing: Procurement, Installation and Service Policy," University of Tasmania, Feb. 2004, http://www.utas.edu.au/itr/policies/standards_private/dtpolicy.pdf.

* cited by examiner

*Primary Examiner*—Hetul Patel
(74) *Attorney, Agent, or Firm*—Marshall, Gerstein & Borun LLP (57) ABSTRACT

A computer is modified to add a memory management module between a memory controller and memory. The module may control or intercept signals between the memory controller and the memory to disable a portion or all of the computer's normal function. The memory management module may be a discrete device or may be part of the memory controller itself.

4 Claims, 6 Drawing Sheets

PRE-PAID COMPUTER MONITORING HARDWARE

BACKGROUND

Pre-paid models of doing business have been adapted to many applications, such as cell phones. In such devices, the initial cost of a device is fronted by a party in exchange for a stream of payments in the future. The device has a monitoring function that ensures that the user stays in compliance or else imposes sanctions such as ending service. However, many monitoring functions and devices may be hacked or modified such that the metering function is avoided but the device has the same or acceptable performance.

SUMMARY

A computer is modified to add a memory management module between a memory controller and memory because this area is especially sensitive to any changes such as hacking. The memory management module may be a discrete device or may be part of the memory management controller itself. The memory management module may sanction hacking behavior by limiting addressable memory available to a user. The memory management module may have its own processor and some trusted code to perform the monitoring and sanctioning functions. The memory management module may review a variety of devices near the CPU to monitor that sanctionable behavior is not occurring.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
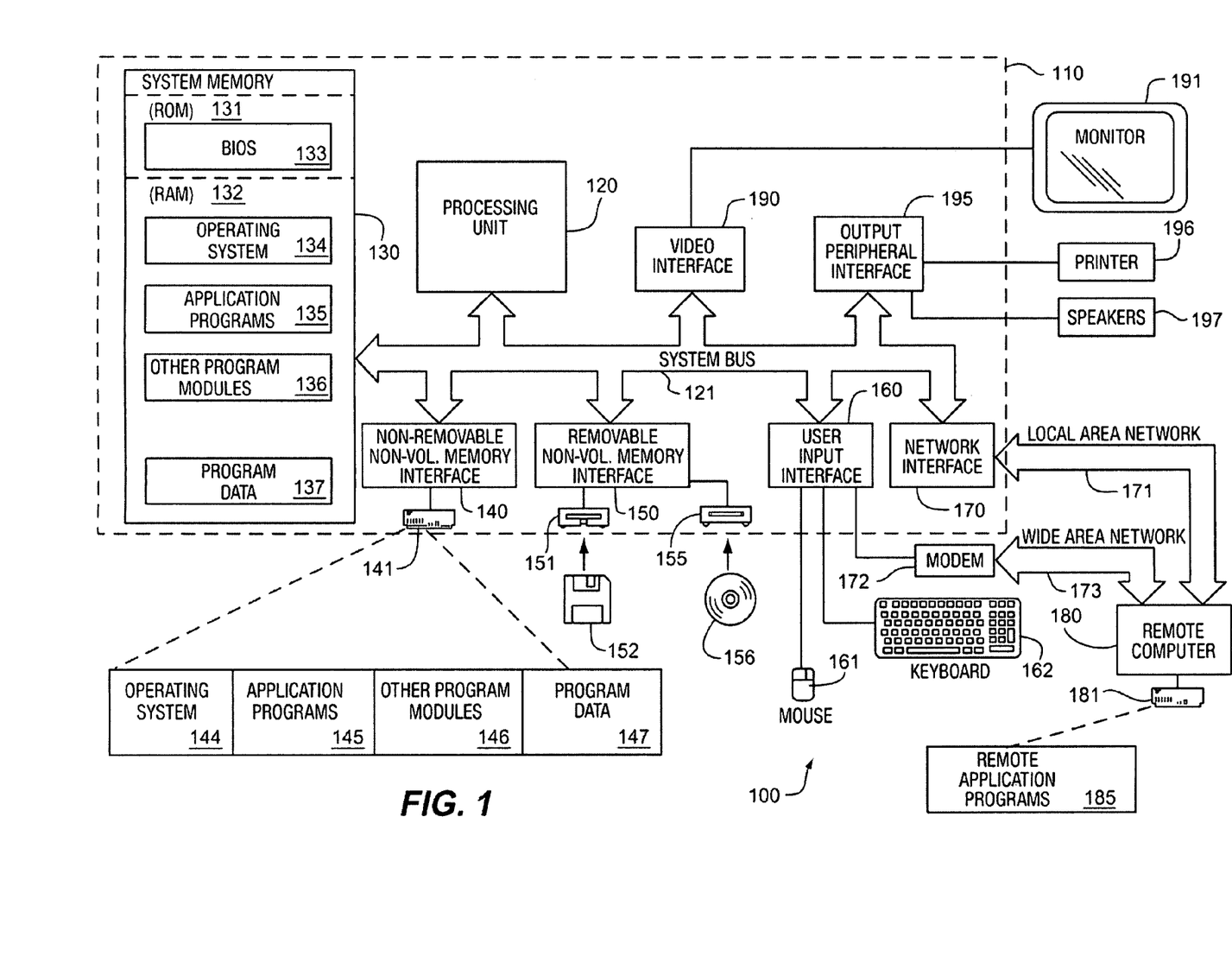
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Currently, software methods may allow a person to acquire a PC through either a subscription service or pre-paid credit cards that allow periodic or delayed payments toward the purchase or use of the PC. An underwriter (e.g. a bank, telecom provider) may purchase PCs and then lease them to individuals. The PCs may run some software, such as an operating system, through either prepaid or subscription commercial services. An example may be a version of the Windows operating system described in pending application Ser. No. 10/989,122 filed Nov. 15, 2004 entitled "Method and Apparatus for Provisioning Software" and is hereby incorporated by reference in its entirety. The pending application Ser. No. 10/989,122 may operate by metering the usage of the computer. When time runs out, the user may be given several warnings at stages where the functionality of the PC may be reduced. If the user does not pay for more computer time, the PC may ultimately reduce its functionality to present the user with a text-only interface in which the user may only enter a certificate code that proves that he has paid the required fee. In this state, called "A" mode, the computer may be essentially unusable for anything but entering proof of payment. The PC may enforce this mode by making only a very small amount of memory available to the user to disable any general purpose applications until payment is made.

By way of example, an underwriter may choose to operate a business in which he first purchases a number of secure PCs to re-sell by lease or installment payment to customers. In order for this to be a viable business for the underwriter, the underwriter may need to ensure that the computer maintains its value as the underwriter pays the balance due on the machine to the machine's original seller. One of the biggest threats to a leased PC secured only by software methods may be users who reinstall the operating system (such as with a pirated version of Windows). This action may effectively replace all of the metering software that is on the machine and allow that person to have a fully functioning computer without the obligation to make subscription or installment payments to the underwriter.

Figure 2:
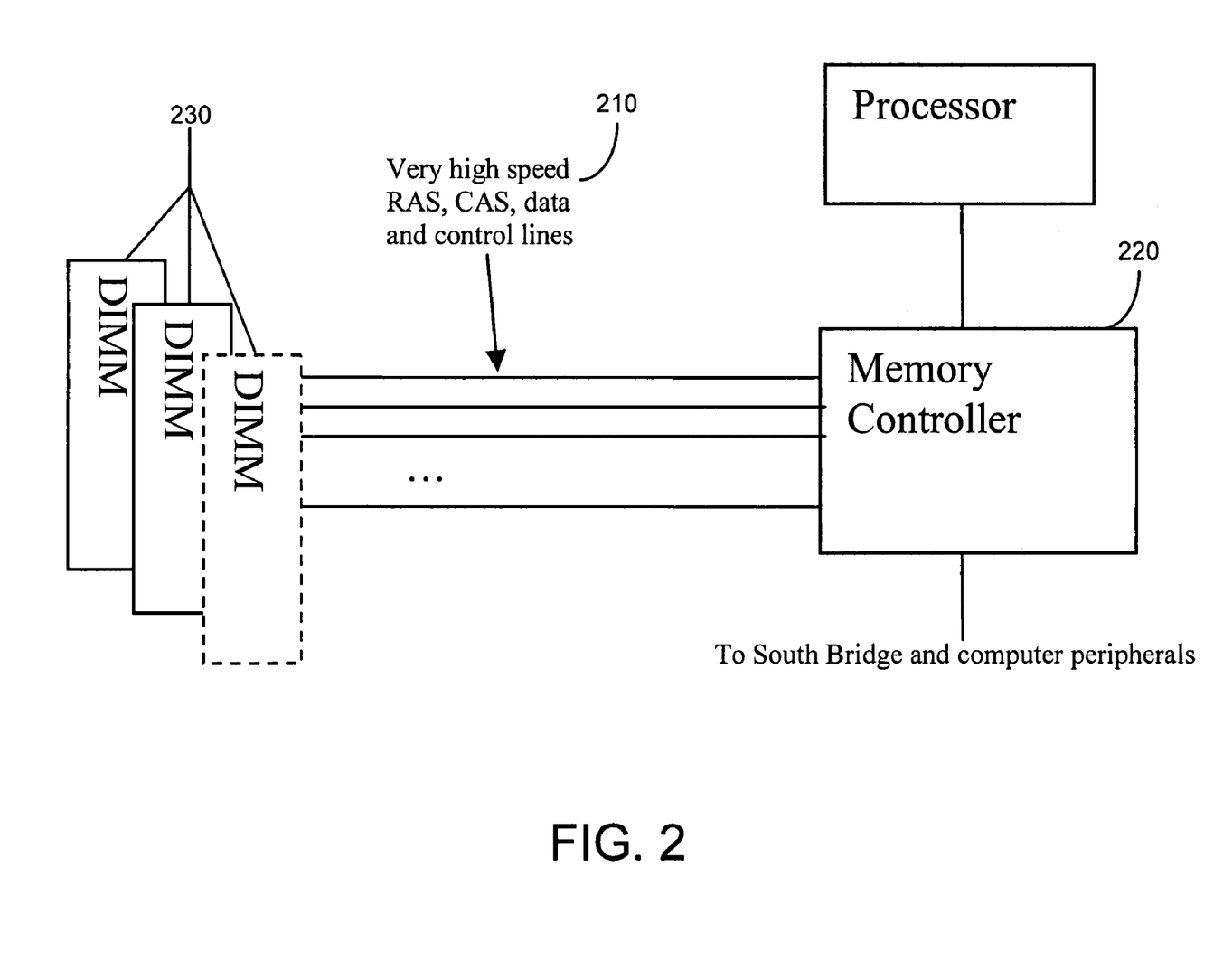
FIG. 2 is a block diagram of a memory controller circuit.

It may be useful to have metering functionality installed in hardware so that tampering with the hardware would render the computer virtually worthless. One spot to place metering hardware is in the high speed data lines leading from the memory controller to the front side memory. The CPU to memory interface is one of the most difficult areas of motherboard designs to create and any hacking, modification, tinkering, etc, in this area can result in significantly degraded performance. FIG. 2 may be an illustration of a common CPU to memory interface. It consists of very high speed analog lines 210, primarily Row Address Strobe (RAS) and Column Address Strobe (CAS), that link the memory controller 220 to Dual In-Line Memory Modules (DIMMs) 230. Typically, computer manufacturers may have to carefully construct these circuits using high speed analog simulations to get the correct lengths. Any attempt to alter the computer in this area without doing performing detailed length analysis may cause the computer not to function. These components' critical functionality may make this area of the PC very difficult to modify or hack. Therefore, the memory interface may be a particularly useful place to directly enforce hardware limitations that maintain the security features of leased PC.

Figure 3:
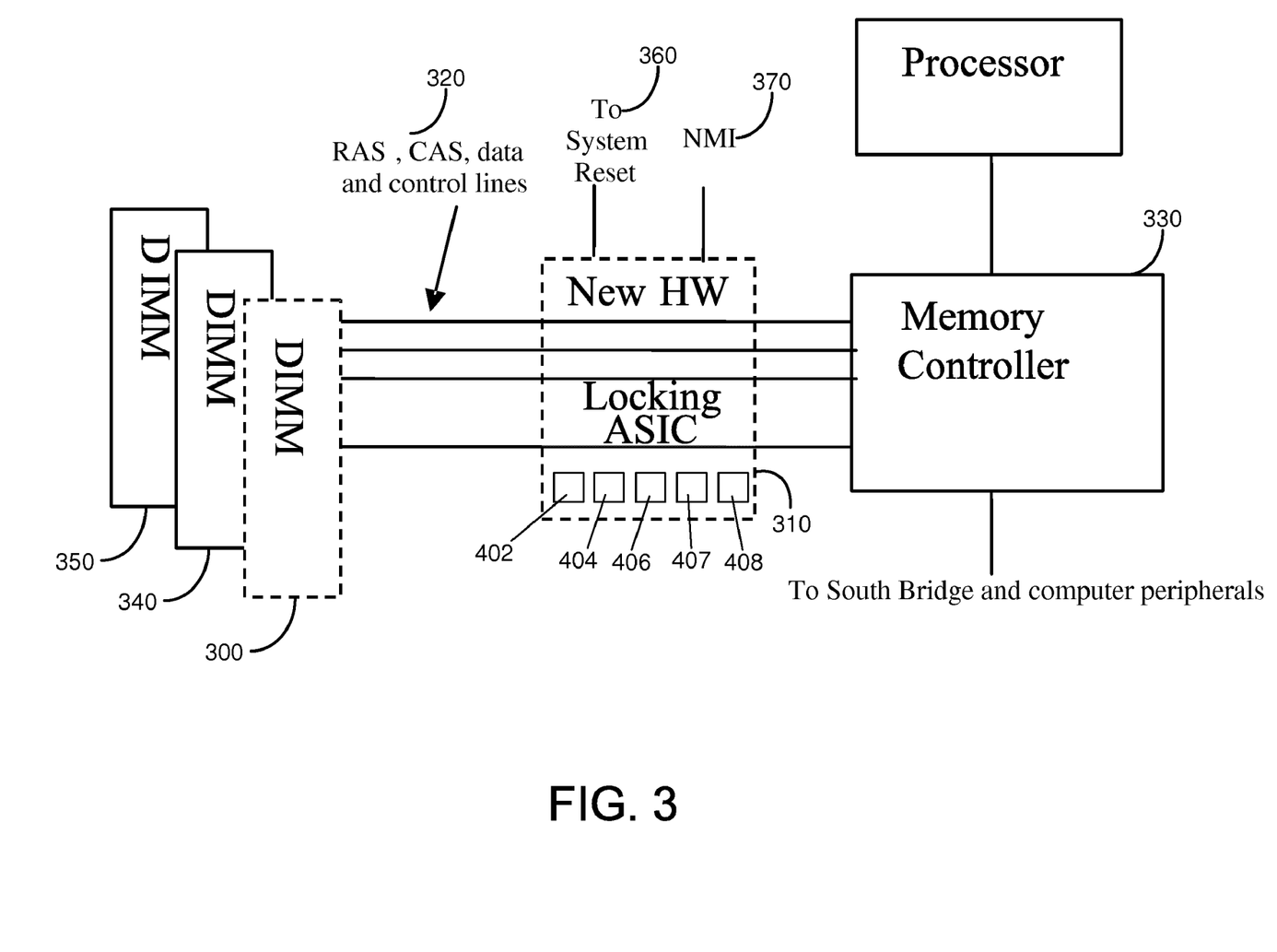
FIG. 3 is a block diagram of a modified memory controller circuit.

With reference to FIG. 3, a small "trusted" hardware locking piece 310 such as an Application Specific Integrated Circuit (ASIC) may intercept signals in the computer's memory bus, and thereby enforce hardware limitations (such as reduced amount of memory) when a user fails to make timely payments. The ASIC may be referred to as a memory management module 310 and may further be described as a "discrete" implementation. The complexity of the memory bus interface, as mentioned above, may make the discrete memory management module 310 difficult to access without destroying the PC's performance. Additionally, intercepting these memory bus signals with a discrete memory management module 310 may allow the direct control of the amount of physical memory that the system may use. For example, a non-paying user may be given only enough memory to run a small utility that renews his subscription. Note that the discrete memory management module 310 may also be implemented in a variety of other technologies, including by example and not limitation, Field Programmable Gate Array (FPGA) and Programmable Array Logic (PAL) microchips.

A discrete memory management module 310 may be attached to the motherboard. The discrete memory management module 310 may be installed as a device between the memory controller 330 and the memory 300, 340, 350. The analog design of the data lines between the memory management module 310 and the memory 300, 340, 350 may take into account that the memory management module 310 may be between the memory controller 330 and the memory 300, 340, 350 such that performance will not be negatively affected.

Typically there may be as many as three DIMMs comprising the memory 300, 340, 350 on a motherboard. It may be possible to replace the first DIMM 300 with this discrete memory management module 310 and not substantially alter the analog aspects of the motherboard. The discrete memory management module 310 may need to contain a very high speed interface that intercepts one or more critical lines 320 between the memory controller 330 and the remaining two DIMMs 340, 350. Further, an additional wait state may need to be added to memory accesses to accommodate the additional load. The difficult implementation may hinder a hacker attempting to interpose any kind of circuitry in its path. The discrete memory management module 310 may also contain a small embedded processor, access to some amount of memory such as secure FLASH, and an on-board dynamic memory for scratch storage. It may be preconfigured (flashed) at the factory with a 'trusted' piece of software which may be stored in the FLASH. The discrete memory management module 310 may also have a routine that allows it to verify and update the flash from a known or signed source. It may also execute only code that comes from its own FLASH storage, which is inherently trusted.

The discrete memory management module 310 may be interposed between the memory controller 330 and the memory 300, 340, 350 in a Ball Grid Array (BGA) package, or similar, tamper-resistant package. One example method of mounting the discrete memory management module 310 may be on a multi chip carrier with one of the other devices on the carrier being the flash chip. To assemble the discrete memory management module 310, the flash chip may first be flashed, then attached to the carrier or motherboard. Epoxy or other filler may be used such that attempted removal of the device 310 may destroy the motherboard. Furthermore, any attempt to "jump" the memory management module by first removing the management module 310 and thus make the PC fully functional may be thwarted by the Epoxy mounting.

As previously mentioned, the RAS/CAS data control lines 320 between the memory controller and the DIMMs may have an extremely narrow set of critical timings that must be met for PC 110 functionality. Placing the discrete memory management module 310 on the data control lines 320 or between the memory controller 330 and the memory 300, 340, 350 may be difficult, but also may be much more secure. A threat to the discrete memory management module 310 may be removing it, which may result in free and unencumbered access to the PC 110. However, the critical timings of the interface between the memory controller 330 and the memory 300, 340, 350 may be incorporated into the design of the discrete memory management module 310 to deter removal. Specifically, the motherboard may be initially designed to require the discrete memory management module 310 as part of the connection between the Northbridge and the DIMMs for the connection to work properly. As previously mentioned, careful analog simulation in the design of the Northbridge/DIMM interface may be necessary. The design and simulation of the Northbridge/DIMM interface may include the interposing discrete memory management module 310 such that the control lines 320 between the memory controller 330 and the memory 300, 340, 350 may only operate efficiently when the interposing device is present. Additionally, removal of the discrete memory management module 310 may render the control lines 320 inefficient or dysfunctional when the device 310 is removed. In other words, the design may require the discrete memory management module 310 to be installed on the board when it is first manufactured for the computer to function; if the device 310 is removed, and jumpers are put in its place, the system 110 may not work.

It may be possible to implement this hardware locking functionality in a system implementing fully-buffered DIMMs (FBDs). Fully buffered DIMMs may use re-buffering (i.e., re-transmitting the signal by interspersing a transistor driver/receiver) of the signal which may allow more DIMMs to connect to the Northbridge chip. A Northbridge that supports FBDs may form a serial connection (instead of a parallel RAS/CAS interface) between itself and the memory 300, 340, 350. The serial connection may be in communication with an Advanced Memory Buffer (AMB) instead of directly to the memory chips. The AMB chip may provide the re-buffering of the signals, and the AMB chip may then re-transmit the signals to the memory 300, 340, 350. In addition, the AMB chip may take the serial connection from the Northbridge and turn it into a normal RAS/CAS (parallel) type memory interface between the memory controller 330 and the memory 300, 340, 350. This may allow using standard DDR2 DRAM chips in a fully buffered system. Implementing a discrete memory management module 310 inside or near an AMB chip may allow the device 310 placement on the high speed lines 320 without re-designing the board as previously explained. This method may also allow embedding the discrete memory management module 310 inside the same AMB chip. This may provide a higher level of security as there would be no interface between the discrete memory management module 310 and the chip that implements a hardware locking mode.

Figure 4:
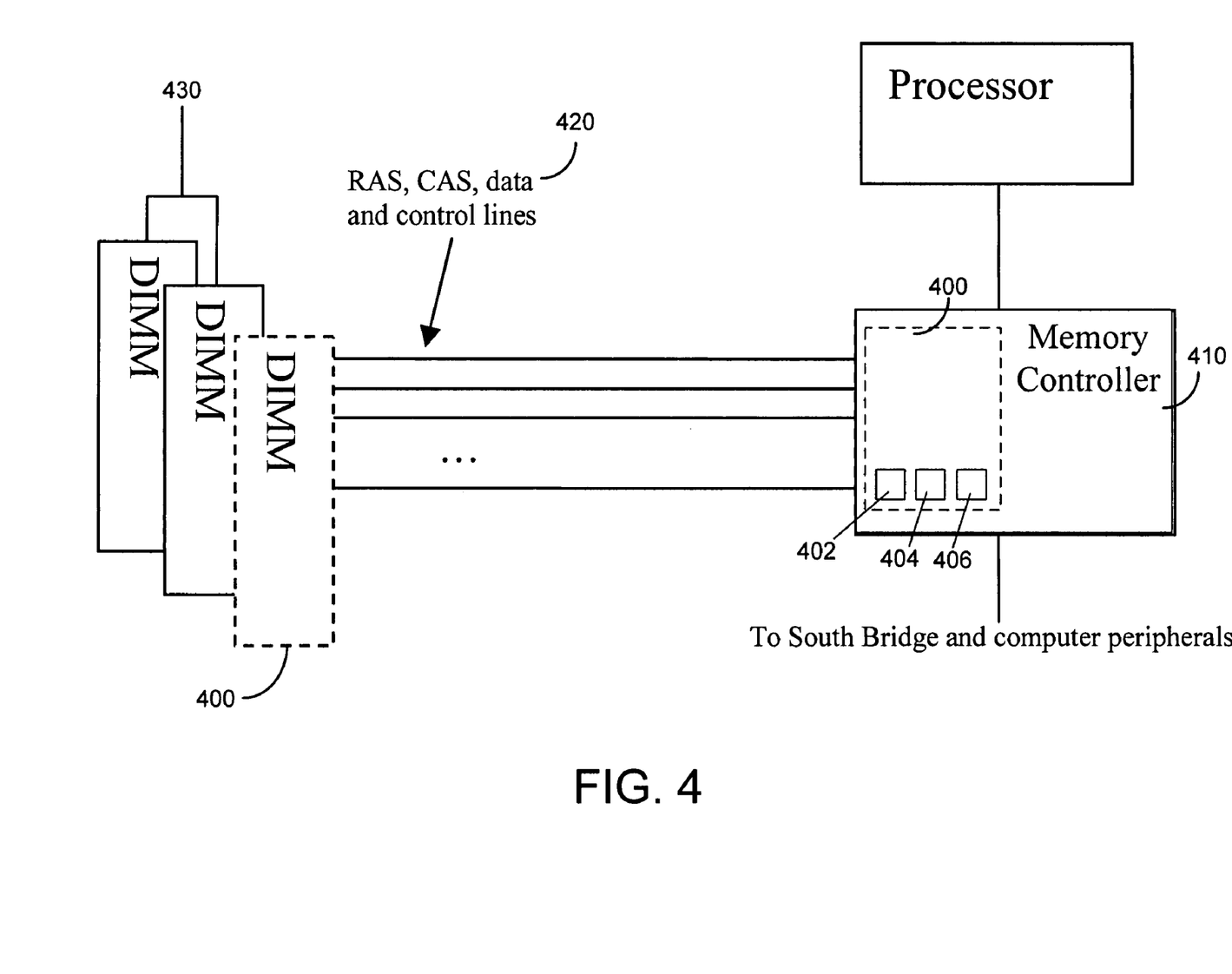
FIG. 4 is a block diagram of a modified memory controller circuit.

As illustrated in FIG. 4, an integrated design for monitoring the system 110 may be implemented. Directly integrating the integrated memory management module 400 into the memory controller 410 may provide better security and mass production capabilities for very large quantities of computers. Further, the integrated memory management module 400 may place no additional loads on the RAS/CAS bus as it may avoid placement on the control lines 420. Also, the integrated memory management module 400 may be secure as it is extremely difficult to penetrate the interior of the memory controller 410 itself. The integrated memory management module 400 may have a processor 402 access to a secure memory 404 and access to dynamic memory 406. The secure memory 404 may store a trusted piece of software that allows the processor to verify and update the secure memory from a known or signal source or may execute code from its own secure storage only. The secure memory 404 may be flash storage and may be preconfigured (flashed) at the factory with a 'trusted' piece of software which is stored in secure memory 404. The integrated memory management module 400 may also have a routine that allows it to verify and update the flash process from a known or signed source. The integrated memory management module 400 may also execute code that comes from its own secure memory 404, which may be inherently trusted. The integrated memory management module 400 may be part of a ball grid array ("BGA") package to limit tampering.

With reference to FIGS. 3 and 4, capabilities of both the discrete memory management module 310 and the integrated memory management module 400 may include: 1) the ability to control the amount of physical memory that the memory controller 330, 410 may utilize by "cutting off" the appropriate signals to the memory 300, 340, 350, 400, 430, thus the devices 310, 400 may reduce the amount memory that may be accessed by the PC 110; 2) the devices 310, 400 may reboot the PC 110 by pulling the Reset line 360; 3) the devices 310, 400 may blue screen the PC 110 by pulling the NMI line 370; 4) the devices 310, 400 may access main memory and establish whether a section of code and/or data was properly signed; 5) code may run in normal user mode in the main processor on the PC 110 and may start a program to be run on the device's 310, 400 embedded processor; 6) the device 310, 400 may contain a secure clock 407, a random number generator ("RNG") 408, and any other hardware (e.g., the processor 402, the secure memory 404, and the dynamic memory 406) necessary to implement the methods of the pending application Ser. No. 10/989,122; 7) the device may initialize memory 300, 340, 350, 400, 430 upon reboot and may assess how much physical memory may be installed in the machine and whether it may change during a reboot. Because of difficulties in manufacturing a high density chip (such as a memory controller) that contains embedded FLASH, it may be necessary to mount the FLASH storage externally to the chip. Therefore, the method may include a multi-chip package.

Figure 5:
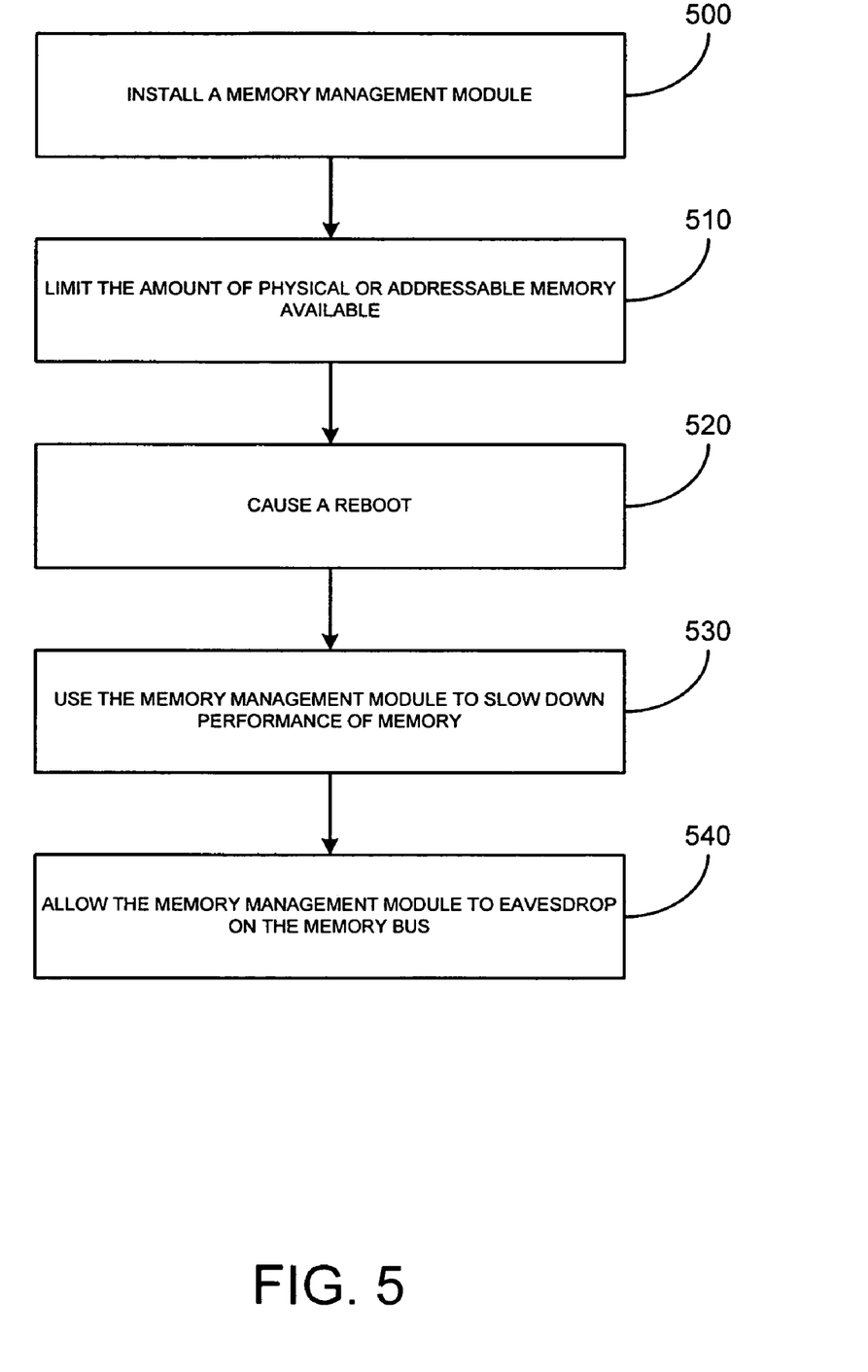
FIG. 5 is a flowchart of the method in accordance with the claims.

FIG. 5 may be a flow chart of method to monitor a PC 110. At block 500, the method may install a memory management module 310, 400 between the memory controller 330, 410 and the memory 300, 340, 350, 400, 430 wherein the memory controller 330, 410 may limit access to a portion or all of the memory 300, 340, 350, 400, 430 when a condition has not been met. The condition may be a payment condition such as the bill for service has not been paid. As previously explained, the integrated memory management module 400 may be part of the memory controller 410.

At block 510, the memory management module may limit the amount of physical or addressable memory 300, 340, 350, 400, 430 available as a sanction. The amount of available memory may be configurable. The memory sanction may present the user with a text only interface that allows a user to enter a certificate indicating that the user has paid the outstanding bill. At block 520, the method may cause a reboot by calling a reset 360 when a condition has not been met such as non-payment or tampering.

At block 530, as a sanction, the method may use the device 310, 400 to slow down performance of memory 300, 340, 350, 400, 430 by adding wait states before memory is accessed. The time of the wait states may be configurable. The memory management module 310, 400 may delay signals along the memory bus control lines comprising RAS and CAS lines 320, 420 between the memory management module 310, 400 and memory 300, 340, 350, 400, 430. The method may also limit memory 300, 340, 350, 400, 430 by returning a no such address signal or by returning a null set.

The method may also implement the sanction by stopping or slowing data to and from the Southbridge. The Southbridge may implement the 'slower' capabilities of the motherboard in a Northbridge Southbridge chipset computer architecture. In a Northbridge Southbridge design, the CPU is at the top of the map at due north and the CPU may be connected to the chipset via a fast bridge (the Northbridge) located north of other system devices such as dynamic random access memory ("DRAM"). The Northbridge may be connected to the rest of the chipset via a slow bridge (the Southbridge) located south of other system devices. The Southbridge may be distinguished from the Northbridge by not being directly connected to the CPU; the Northbridge may tie the Southbridge to the CPU. A contemporary Southbridge may include: PCI bus; ISA bus; SM Bus; DMA controller; Interrupt controller; IDE (SATA or PATA) controller; LPC Bridge; Real Time Clock; power management (APM and ACPI); and Non-volatile BIOS memory. Optionally, the Southbridge may also include support for Ethernet, RAID, USB, audio codec, and FireWire. Rarely, the Southbridge may also include support for the keyboard, mouse, and serial ports, but normally these devices may be attached through a Super IO (SIO) device.

Figure 6:
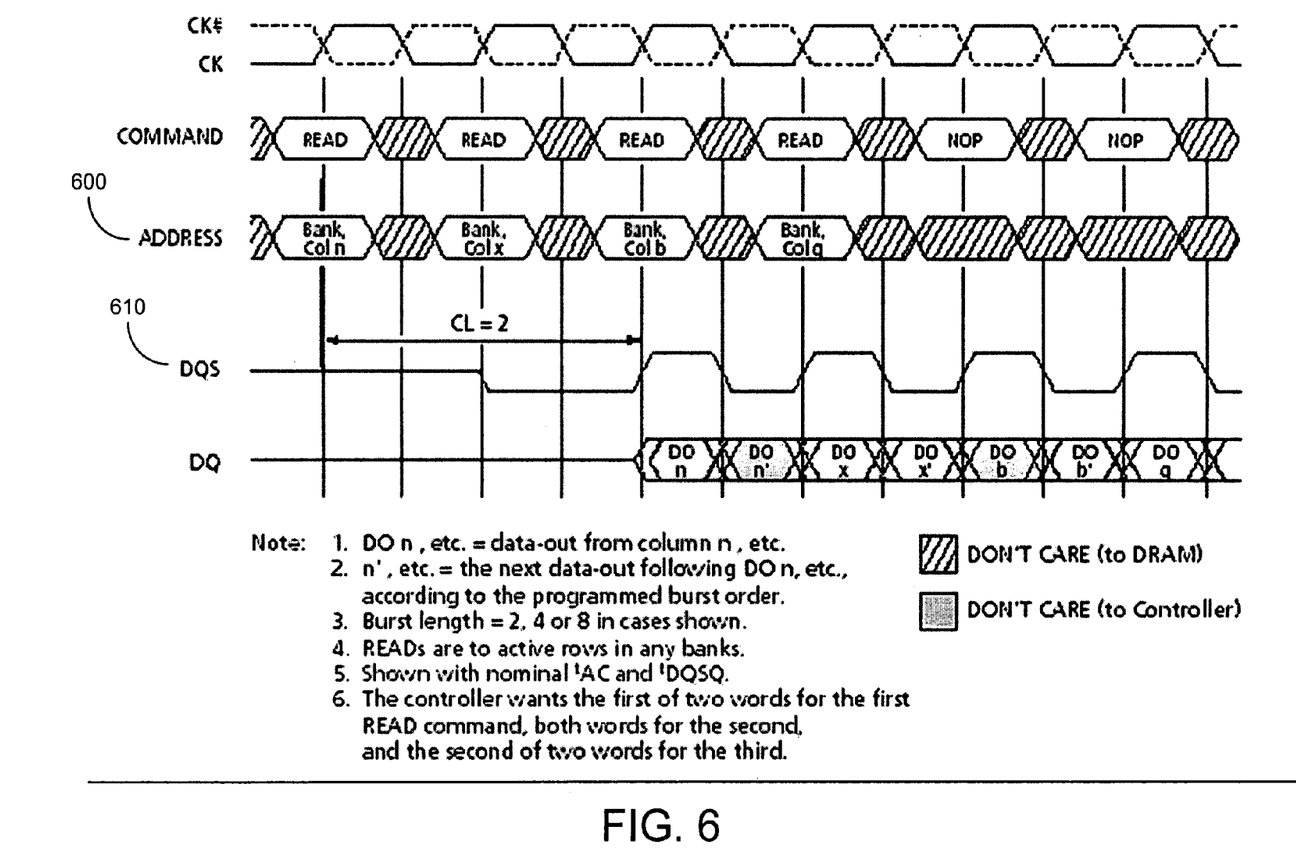
FIG. 6 is a diagram of a memory interrupt.

FIG. 6 with FIGS. 3 and 4 may illustrate one specific implementation of the method at block 530. When in a hardware locking mode (i.e., when total system memory may be limited to some small amount due to the user not paying for PC 110 use), the device 310, 400 may watch the memory bus and decode addresses of all memory accesses (ADDRESS lines 600). If the device 310, 400 sees a memory access to an address above the limit it wishes to enforce, it may intercept Data Strobe (DQS) signals 610 on the control lines 320, 420 and may not pass the strobe 610 along to the memory 300, 340, 350, 400, 430 for the prohibited address. Intercepting the DQS signals may effectively prevent the memory 300, 340, 350, 400, 430 or portions of the memory 300, 340, 350, 400, 430 from being read and written.

Further, the device 310, 400 may initiate a hardware locking mode (sanction mode) by forcing the PC 110 into a reboot and during reboot, the device 310, 400 may constrain the amount of physical memory available to the PC by using the techniques described above. The device 310, 400 may also cooperate with the memory controller 330, 410 and the system BIOS 133 to report the correct, reduced amount of physical memory present in the PC 110 as it is rebooting. This memory may be impossible to return to the original configuration unless a properly signed program or token is present that the device 310, 400 may validate.

To circumvent the possibility of reduced memory function on a secure PC, a user may attempt to utilize memory other than the memory illustrated in 300, 340, 350, 400, 430 to avoid the sanctions. For example, PC architectures may have the ability to reflect memory access cycles on peripheral busses such as Peripheral Component Interconnect (PCI). One of the primary uses of these memory cycles may be to perform "memory mapped I/O" where a peripheral card maps its registers into memory 300, 340, 350, 400, 430 for control and data transfer functionality. If the PC 110 contains a bus that allows memory mapped peripherals, it may be possible to build an adapter card with separate memory on it and use the adapter card's memory on the sanctioned PC 110 instead of main memory. Although this separate memory is significantly slower than system memory, it may allow a hacker to circumvent the restrictions imposed on main memory and potentially run general purpose applications when in "A" mode. The separate memory threat may be mitigated by routing one of the PCI busses so that the device 310, 400 may monitor the PCI bus cycles. The device 310, 400 may monitor an unauthorized memory cycle having the characteristics of memory access instead of memory mapped I/O and may pull the Non-Maskable Interrupt (NMI) 370, causing a blue screen and effectively halting the computer. Further, the device 310, 400 may monitor the Front Side Bus (FSB) and look for snooping cycles that have unauthorized memory addresses. This security concern may not be an issue in the integrated memory management module 400, as that component may participate in the allocation of all memory in the system and the circuit may be modified directly such that it does not map large segments of memory when rebooted into "A" mode.

At block 540, the method may also allow the device 310, 400 to eavesdrop on the control lines 210, 320 between the memory controller 330, 410 and memory 300, 340, 350, 400, 430 and may listen for certain memory messages. An out of compliance signal may cause the system 110 to reboot. Upon reboot, the system 110 may inform BIOS 133 that only a limited amount of memory 300, 340, 350, 400, 430 is available. The device 310, 400 may notice that memory has been limited by the BIOS 133, however, BIOS 133 may have failed to enforce the memory limitation; the method may then impose a progressively harsher penalty. The device 310, 400 may also be periodic. The device 310, 400 may eavesdrop on the Southbridge where the device 310, 400 may listen to the PCI bus and determine if separate memory has been added to avoid the memory during specified periods. If so, the method may sanction the system. The device 310, 400 may eavesdrop on DRAM, the Southbridge or the Northbridge.

The foregoing method may be applied to any computing device where memory resides in a separate component than the memory controller in either device 310 or 400. However, only device 400 may be applied to situations where the memory resides on the same device as the memory controller.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer system comprising:
 a processor;
 a memory controller;
 a memory;
 a memory bus communicating with the memory and the memory controller; and
 a memory management module installed on the memory bus between the memory controller and the memory, wherein the memory management module is configured to: deny access of the memory controller to a first portion or all of the memory when one or more of a payment condition has not been met or a tampering condition has been met, wherein the first portion includes memory addresses that are inaccessible by the memory controller;
 eavesdrop on at least one of the memory bus, a DRAM, a Southbridge, or a Northbridge for an out-of-compliance memory signal, wherein the out-of-compliance memory signal includes a memory access signal having an address that is within the first portion; and
 if the out-of-compliance memory signal is received, the memory management module is further configured to issue a reboot command, and upon reboot, enforce a memory limitation by informing BIOS that only a second portion of the memory is available, wherein the memory addresses of the second portion and the memory addresses of the first portion are mutually exclusive; and
 if the memory management module notices memory has been limited by the BIOS and if the memory management module discovers the out-of-compliance memory si-lal in which the BIOS has failed to enforce the memory limitation, the memory management module is further configured to instruct the system to increase a number of memory addresses within the first portion;

wherein the memory management module is further configured to, upon reboot, initialize the on-board dynamic memory to discover information related to a physical memory, the information related to the physical memory comprising:
an amount of currently-installed physical memory; and
a difference between the amount of currently-installed physical memory and a previously-installed physical memory;
wherein the memory management module comprises:
   a secure clock;
   a random number generator;
   an embedded processor;
   access to a secure memory; and
   access to an on-board dynamic memory; wherein the embedded processor only executes code stored in the secure memory, and the secure memory is preconfigured with a trusted software application, the trusted software application comprising a routine that verifies and updates the secured memory from a known source, the known source comprising a signed source.

2. The computer system of claim 1, wherein the memory management module is further configured to listen to a peripheral bus to determine if additional memory has been added to bypass the memory and if the determination is positive, imposing a sanction on the system, wherein the sanction presents the user with a text only interface that allows a user to enter a certificate indicating that the condition has been met.

3. The computer system of claim 1, further comprising:
a Front Side Bus;
wherein the memory management module is further configured to monitor the Front Side Bus to find snooping cycles, the snooping cycles having memory addresses that are within the first portion, and to discover an unauthorized memory cycle from the snooping cycles.

4. The computer system of claim 1, further comprising:
a peripheral bus comprising a memory access cycle, wherein the memory management module is further configured to monitor the peripheral bus to discover the one or more memory access cycles.

\* \* \* \* \*

UNITED STATES PATENT AND TRADEMARK OFFICE
CERTIFICATE OF CORRECTION

PATENT NO. : 7,596,671 B2 Page 1 of 1
APPLICATION NO. : 11/370411
DATED : September 29, 2009
INVENTOR(S) : Frank et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-eighth Day of September, 2010

David J. Kappos
*Director of the United States Patent and Trademark Office*